J. F. OLDFIELD.
PORTABLE DRY KILN.
APPLICATION FILED OCT. 16, 1912.
1,194,776.
Patented Aug. 15, 1916.
7 SHEETS—SHEET 1.
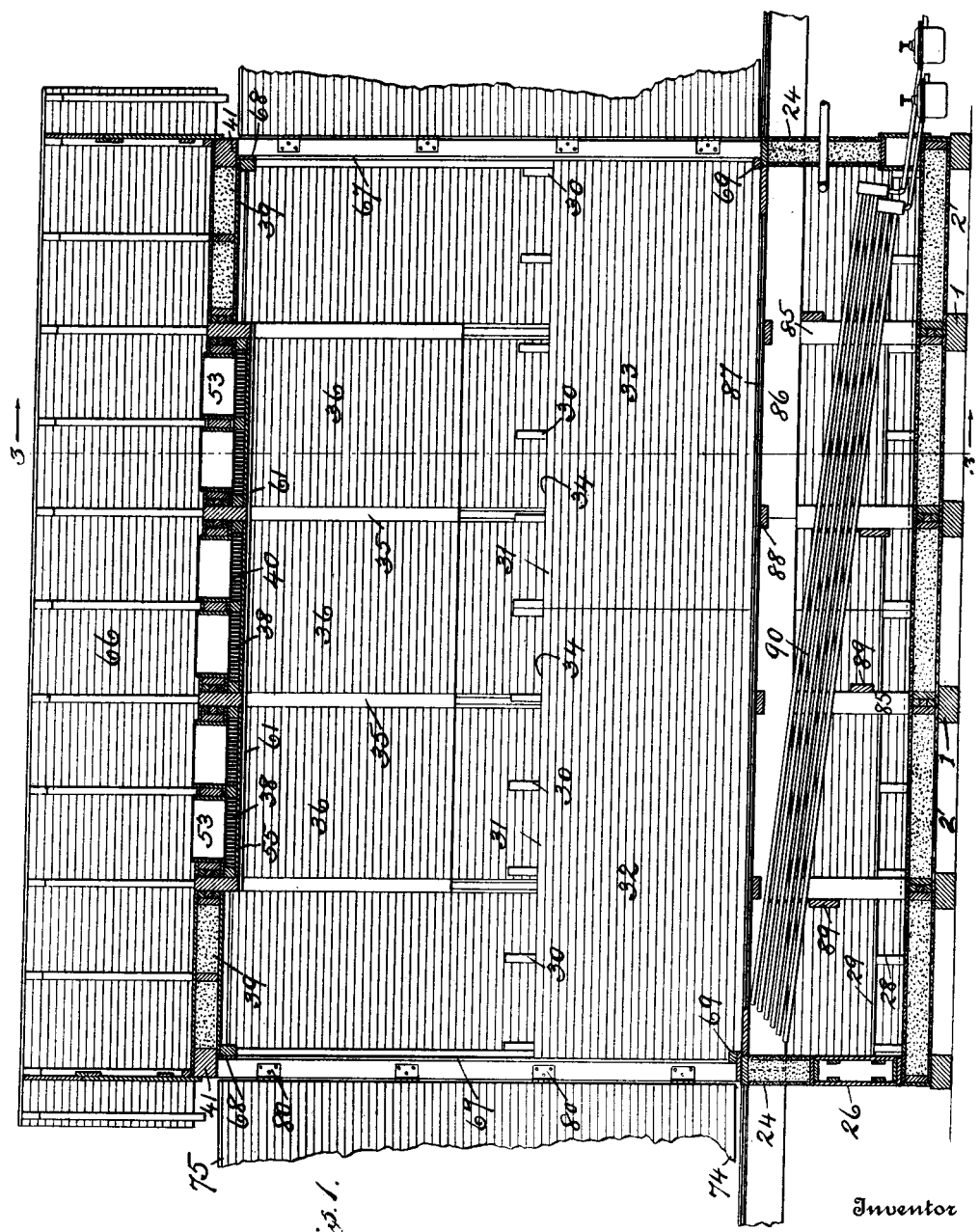
Witnesses
Edwin L. Bradford
G. Ferd. Vogt
Inventor
John F. Oldfield
By Mann & Co,
Attorneys

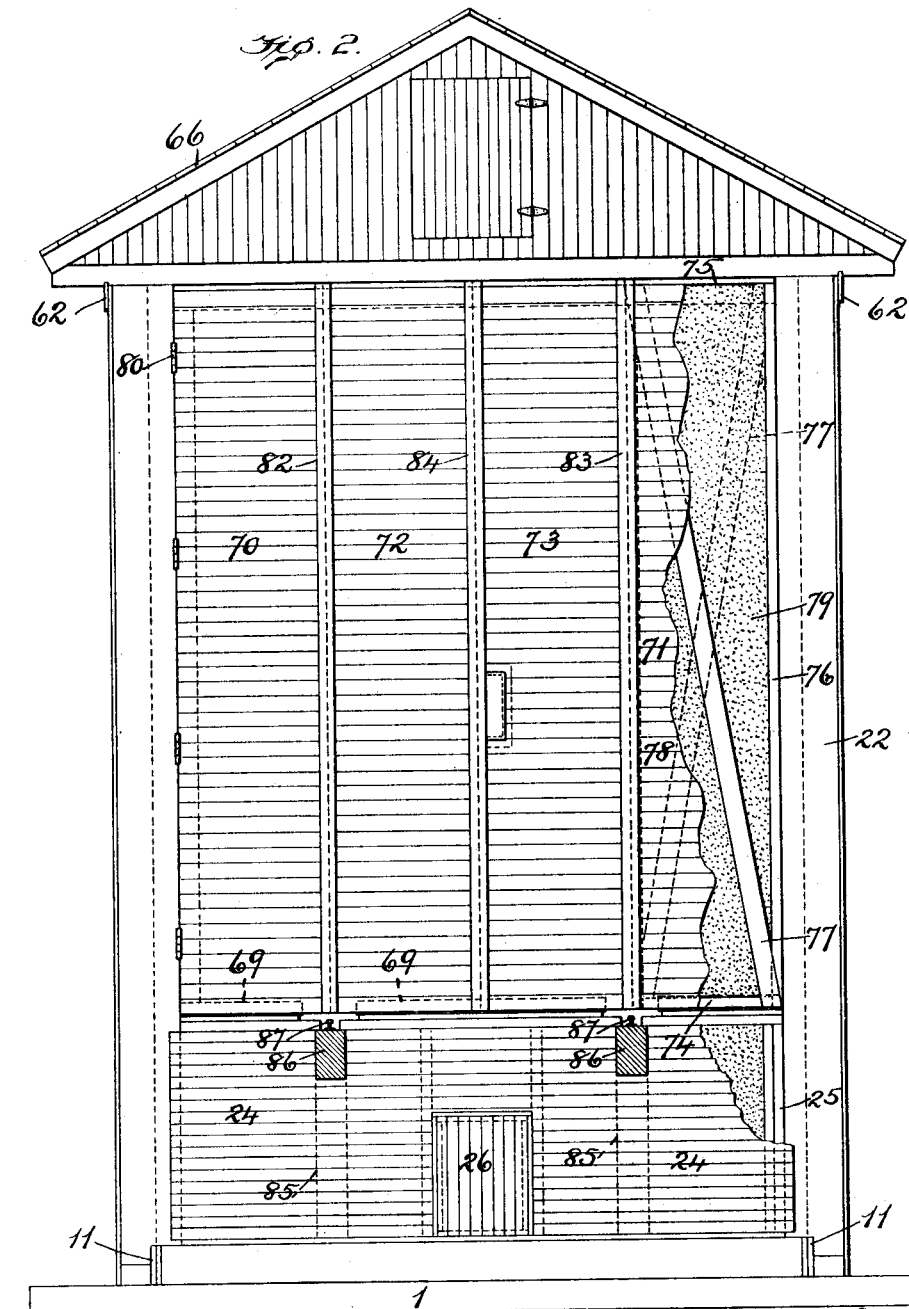

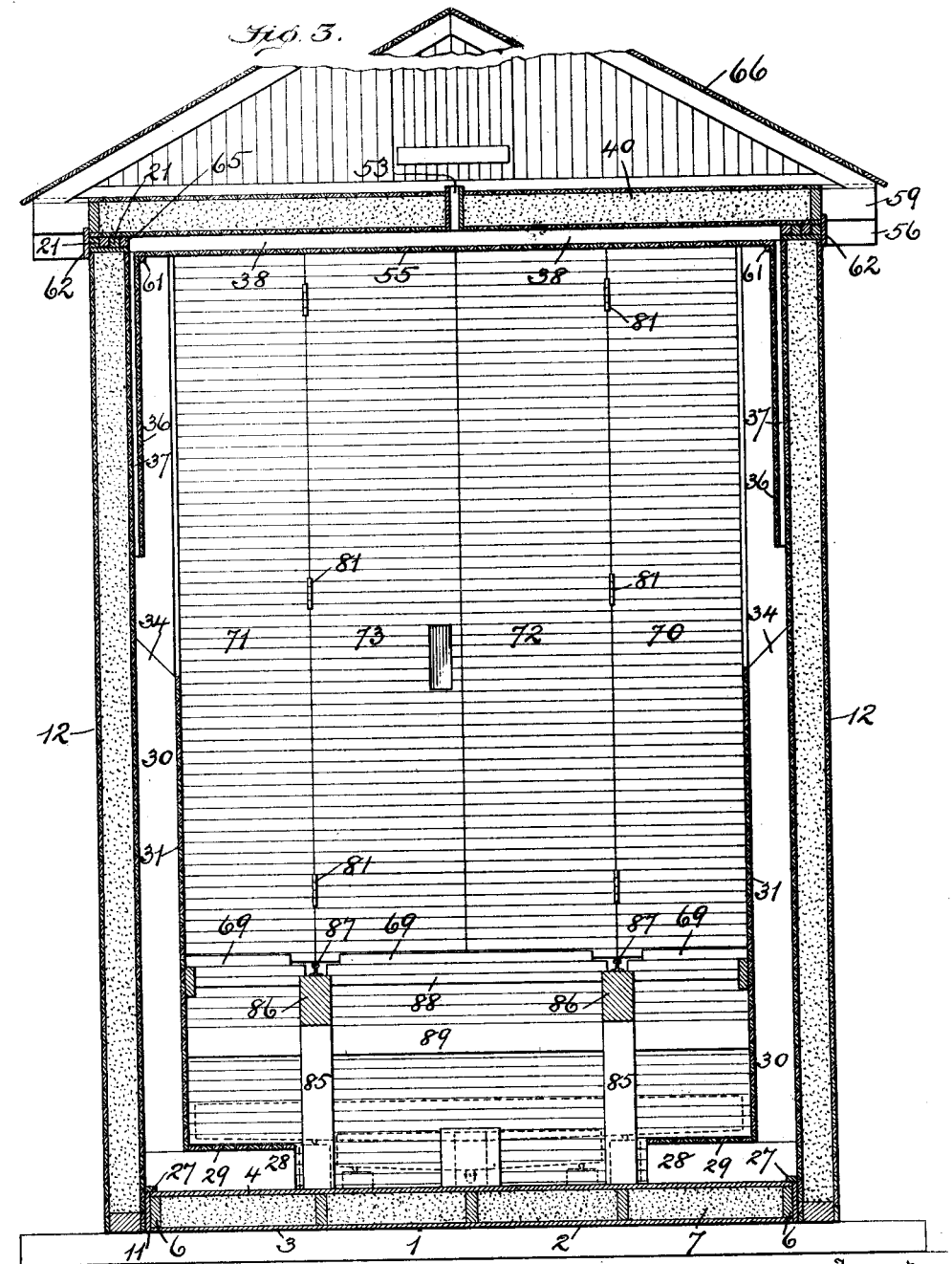

J. F. OLDFIELD.
PORTABLE DRY KILN.
APPLICATION FILED OCT. 16, 1912.
1,194,776.
Patented Aug. 15, 1916.
7 SHEETS—SHEET 4.
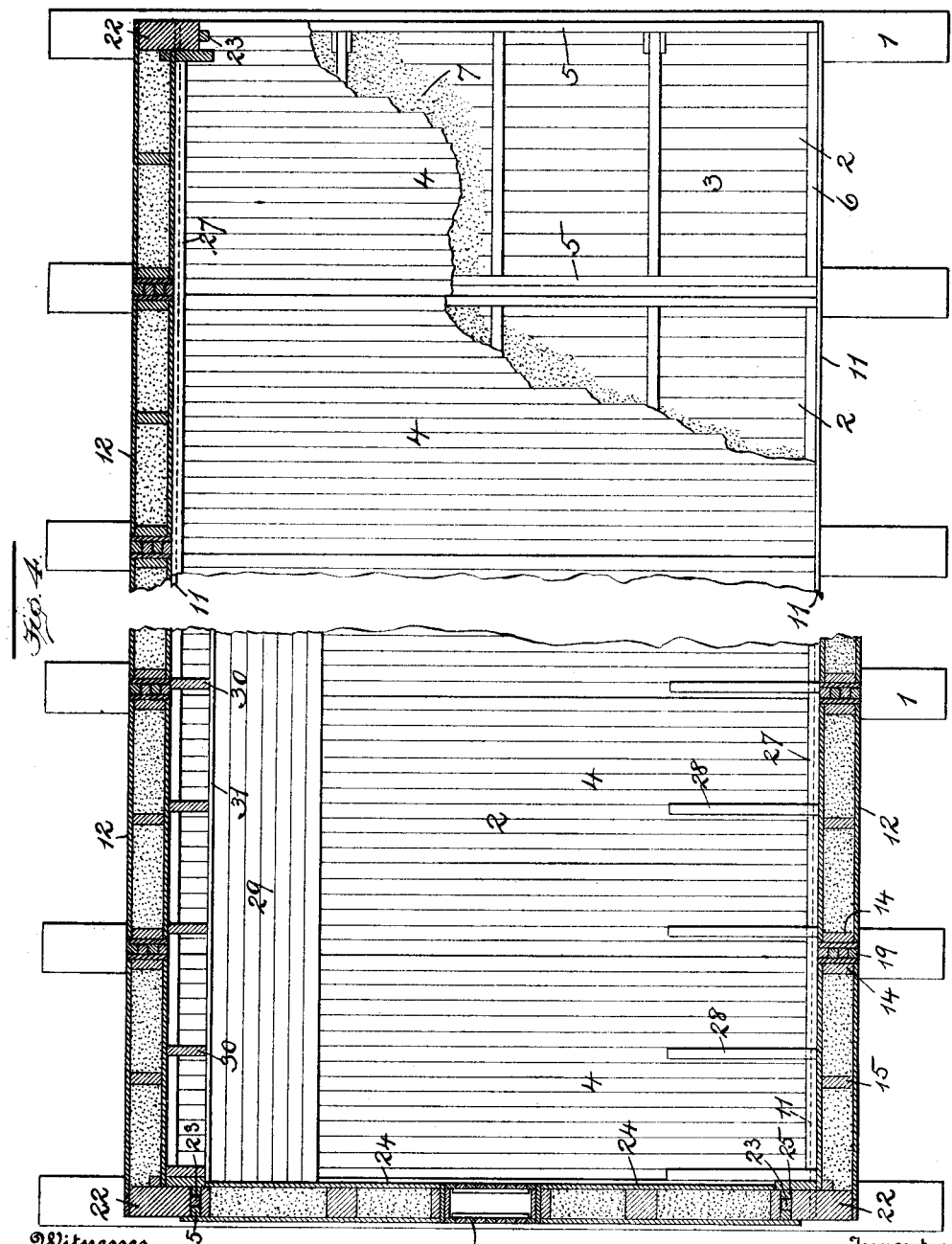

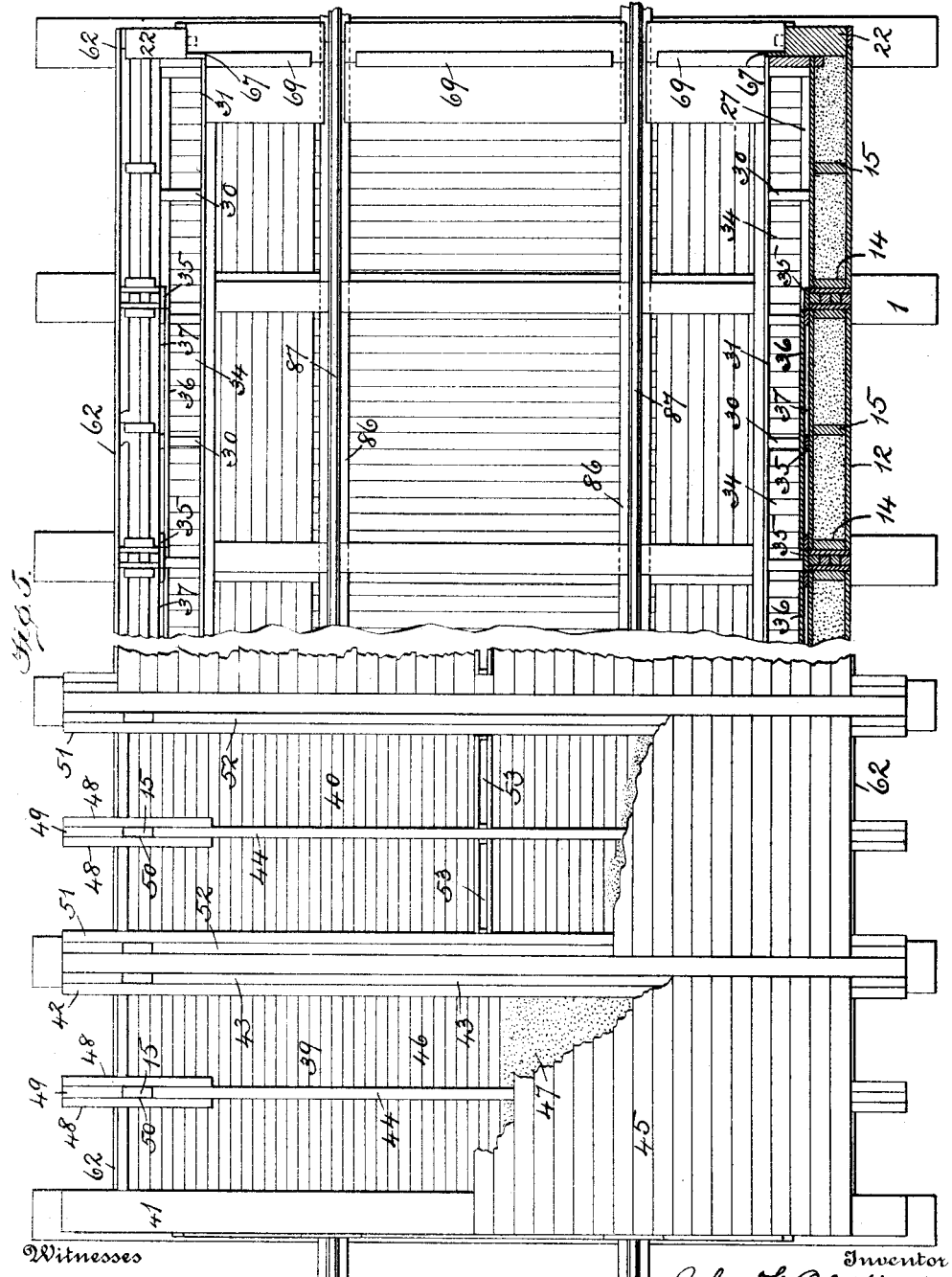

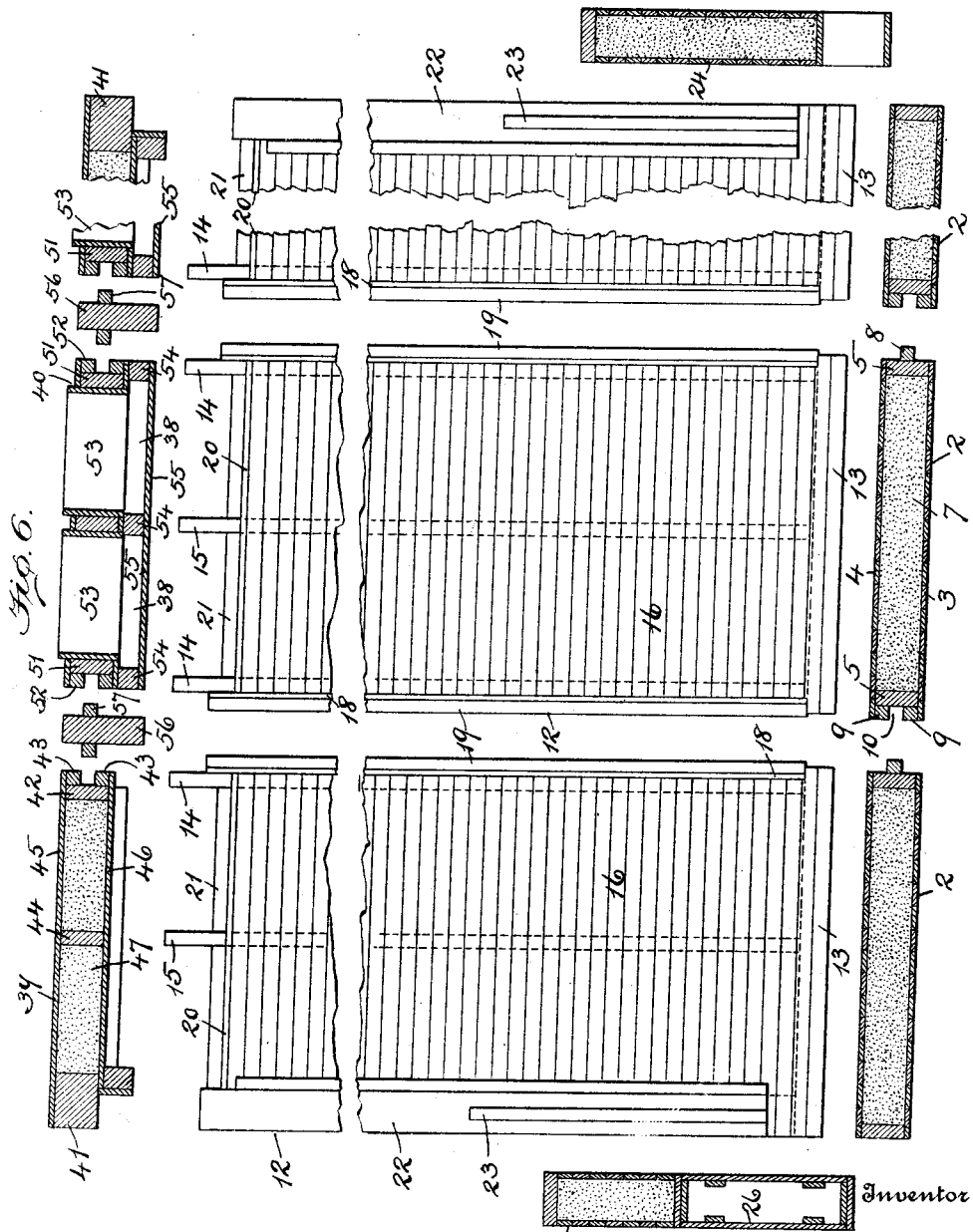

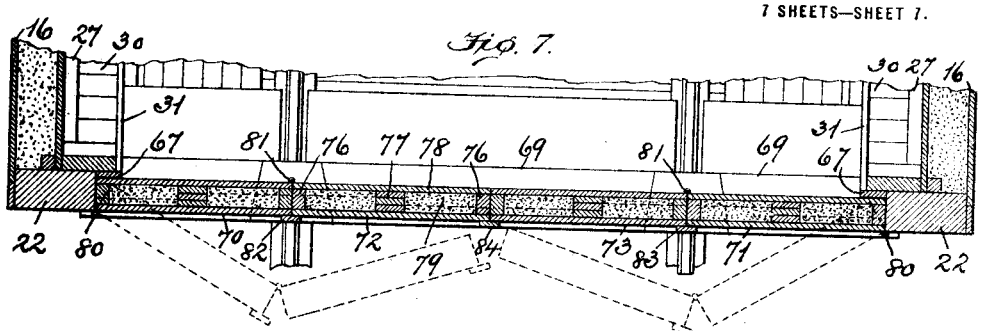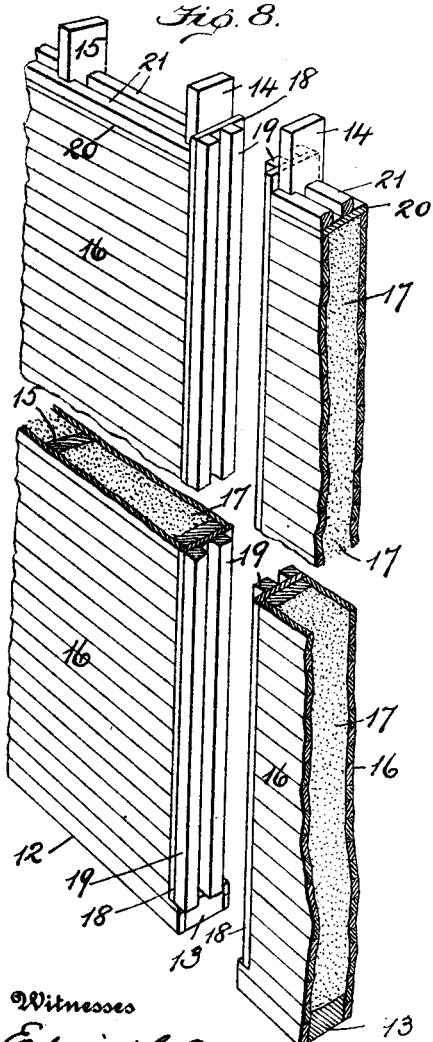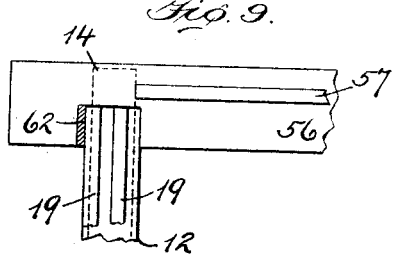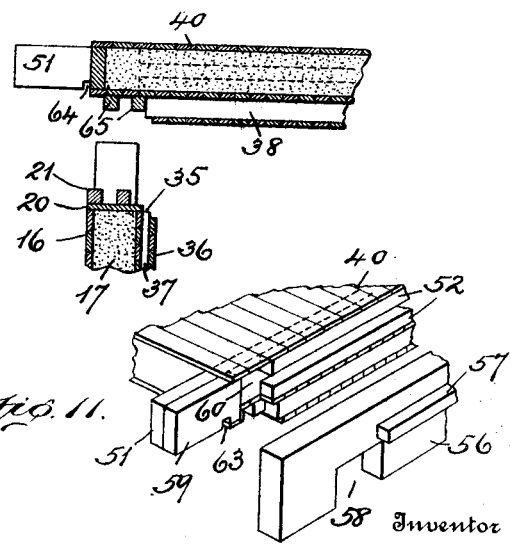

UNITED STATES PATENT OFFICE.

JOHN F. OLDFIELD, OF BEL AIR, MARYLAND.

PORTABLE DRY-KILN.

1,194,776.  Specification of Letters Patent.  Patented Aug. 15, 1916.

Application filed October 16, 1912. Serial No. 726,033.

*To all whom it may concern:*

Be it known that I, JOHN F. OLDFIELD, a citizen of the United States, residing at Bel Air, in the county of Harford and State of Maryland, have invented certain new and useful Improvements in Portable Dry-Kilns, of which the following is a specification.

This invention relates to an improved portable dry kiln wherein the same is constructed in an improved manner to enable it to be set up and taken down in order that it may be utilized at places convenient or accessible to the green lumber which it is desired to dry.

The kiln is of that construction which makes use of hot humid air under slight pressure which air is circulated and repeatedly reheated and a moist temperature in excess of the boiling-point of water is maintained.

The invention is illustrated in the accompanying drawings wherein,

Figure 1 shows a vertical longitudinal sectional elevation through the kiln constructed in accordance with the invention. Fig. 2, an end elevation of the kiln,—one of the door sections being shown in section. Fig. 3, a vertical cross-sectional elevation through the kiln,—the section being taken on the line 3—3 of Fig. 1. Fig. 4, shows a sectional plan through the kiln from the green end to the dry end,—the section beginning above the lower ends of the said flues then above the floor sections and then through the floor sections. Fig. 5, shows another sectional plan view beginning at a point above the track rails and gradually extending upwardly and laterally, finally passing through the roof. Fig. 6, is a view showing several floor side and end wall and top or ceiling sections all separated but ready to be closed together for assembly. Fig. 7, shows a sectional plan view through the door sections and the adjoining parts of the kiln. Fig. 8, illustrates one side wall section in perspective and a portion of an adjoining section in vertical section. Fig. 9, shows a detail of the joint which secures one of the side sections and the horizontal rafters together. Fig. 10, is a vertical cross-section through the same,—the parts however being separated, and Fig. 11, shows a perspective view of an edge of a ceiling section and the end of a locking beam which is employed to join adjacent sections and to secure the ceiling to the side sections.

Referring to the drawings the numeral, 1, designates the foundation sills of which there are a sufficient number to properly sustain the bottom sections which latter are to be laid flat upon said sills.

The bottom sections, 2, are each in the present instance of a rectangular form and each section has a bottom, 3, a top, 4, side walls, 5, and end walls, 6, which together form a rectangular receptacle for the reception of a suitable filling, 7, such as saw-dust which latter serves as an insulation. The side wall, 5, at one longitudinal side of each bottom section is provided with a central longitudinal tongue strip, 8, while the opposite side wall is provided with spaced-apart longitudinal strips, 9, with a longitudinal groove, 10, between said strips whereby when the bottom sections are butted together the tongue, 8, on one will enter the groove, 10, on the other and securely lock the two together. It will be noted, by reference to Figs. 1 and 6 that the bottom, 3, and top, 4, of the bottom sections are so laid that when the sections are butted the tops and bottoms will close together thus making a tight joint.

In the finished kiln, as can be seen in Figs. 2, 3 and 4, of the drawings there is interposed between the ends of the bottom sections and the side wall sections, a tie bar, 11, which latter extends from one end of the kiln to the other as will presently be more fully explained.

The sides of the kiln are formed of sections, 12, and each has a studding sill, 13, at its lower end from which two end studs, 14, and a central stud, 15, extend vertically. These vertical studs are all tied together by the inner and outer horizontal boards, 16, which latter form a chamber in which a filling of non-conducting material such as saw-dust, 17, is packed.

The vertical outer face of the end studs, 14, and the vertical ends of the horizontal boards, 16, are covered by a vertical board, 18, to which two vertical tongue strips, 19, are secured. The position of these tongue strips on the adjoining board, 18, of abutting sections is such that when the sections are butted the tongue-strips on the two sections will interlock and form a tight joint. In the same way a horizontal board, 20, is secured along the upper end of each side section and carries horizontal tongue strips, 21, which are to interlock with the ceiling structure, as will presently be explained.

By referring to Figs. 6 and 8 of the drawings it will be seen that the studs, 14, and, 15, of the side sections project above the side boards, 16, and also above the boards, 20, and tongue strips, 21. The object of this is to provide for connecting the side sections with the ceiling structure as will presently more fully appear.

Each end side-section has a corner post, 22, of a stiff timber the lower end of which is notched so as to fit over the end of the bottom section.

After all of the side sections have been placed side by side with the tongues, 19, of one section interlocked with the corresponding tongues on the other section, the side bar, 11, is laid against the vertical inner side of the studding sills of all the sections and secured thereto so as to bind the sections together. This side bar, 11, is placed at the inner side of the side-section sills so that its vertical flat side will seat against the ends of the bottom sections and by so placing said side bar the same will be protected from the weather.

At that side of the corner post which joins with the end wall sections, the vertical face of each end post is provided with a short vertical tongue, 23, as may be seen in Figs. 4 and 6, so that a lap joint may be made between said corner posts and the lower end-wall sections, 24, which latter are provided with spaced-apart vertical edge-tongues, 25, between which latter the tongue, 23, on the corner post projects. A suitable removable door, 26, is provided in one end section, 24, by which access may be gained to the interior.

By referring to Figs. 3 and 4 of the drawing it will be noted that an interior sealing strip, 27, is provided at the joint between the bottom sections and the side sections said strip being butted against the inner surface of the side sections and extending horizontally over the side bar, 11, and onto the top boarding, 4, of the bottom sections.

Upon referring to Figs. 1, 3 and 4 of the drawings, it will be noted that a plurality of flue boards, 28, rise from the bottom sections and that said boards extend horizontally from the side sections and along the top, 4, of said bottom section. These flue boards are arranged at intervals and in spaced-apart position on the bottom sections between the opposite ends of the kiln and are held in such position by the cover-boards, 29, which are secured along their upper edges. In practice these cover boards, 29, are of sufficient length to cover a plurality of the flue boards and when so attached form lower horizontal flue sections each section having a plurality of such flues. The end of each flue board, 28, adjacent to the vertical side wall sections sustains a vertical partition, 30, which latter extends upwardly at the inner side of the side sections so that a plurality of horizontal boards, 31, may be secured against the vertical faces of said partitions, 30, and form a series of vertical flues, which communicate at their lower ends with the horizontal flues on top of the bottom sections as best shown in Fig. 3. It will thus be understood that the partitions, 30, and the boards, 31, are secured together in sections, 32, and, 33, as best shown in Fig. 1 which extend from the top side of the bottom section up into the kiln and that the flues of such sections open at their upper ends, 34, directly into the kiln chamber. It will also be noted that the lower flues are provided at each side of the kiln and extend practically from one end to the other of said kiln.

Above the lower flue sections, 32, and, 33, and directly against the vertical joints of the side sections there are provided a plurality of vertical strips, 35, shown best in Fig. 5, of the drawings. These strips, extending as they do toward the interior of the kiln, form spacers against which vertical flue-boards, 36, may be secured so that when said flue boards are in place a series of narrow flues, 37, will extend upwardly beginning at a point somewhat spaced above the upper ends, 34, of the lower flues and extending up to a series of horizontal ceiling flues, 38, which will presently be explained.

The ceiling of the kiln is also formed of a plurality of sections, 39, and, 40, respectively. In the present instance the sections, 39, are located at the opposite ends of the kiln while the sections, 40, are interposed between said end sections.

Each end section has a horizontal beam, 41, along its outer side; a horizontal beam, 42, with spaced-apart tongues, 43, along its opposite or inner side and a central beam, 44, all of which together form a substantially rectangular frame with top and bottom cover boards, 45, and, 46, as shown in Fig. 6. Each ceiling section also has a filling of non-conducting material such as sawdust, 47.

The central beam, 44, of the end sections is somewhat shorter than the section itself and at each end this central beam has two short side beams, 48, and a spacer block, 49, at the outer end and between said side beams (see Fig. 5). By means of this construction a vertical passage, 50, is formed at the two ends of the central beam so that when the end sections are laid on top of the side wall sections the upper projecting ends of the central studs, 15, of the side sections may enter the said vertical passage, 50, and thus tie the opposite side sections together.

The intermediate sections, 40, differ from the end sections in that both side beams, 51, are provided with spaced-apart tongues, 52, and that each of these sections has a vent passage 53, which extends vertically therethrough as shown in Figs. 3–10 and 11 of the drawings. The intermediate sections are also provided on their under sides with horizontal ceiling flues, 38, which are formed by spaced-apart horizontal bars, 54, to which flue boards, 55, are secured, as shown in Fig. 6. The intermediate ceiling sections, 40, also have the central beam, 44, with the short side beams, 48, and spacer block, 49, at the ends so as to form the vertical passage or recess into which the upper ends of the central studs, 15, on the side sections project. To secure the ceiling sections together there is provided a locking beam, 56, which has a longitudinal tongue, 57, along each side and whose ends are provided with bottom-edge notches, 58 (see Figs. 3–6–9 and 11). The notched ends of these locking beams straddle the upper end of the side sections and the tongues, 57, at the sides project between the spaced-apart tongues, 43, on the sides of the beams, 42, of the ceiling sections to engage the latter.

By reference to Figs. 5 and 11 of the drawings it will be noted that both the tongues, 43, and, 52, of the adjacent ceiling sections are shorter than the beams, 42, and, 51, to which they are secured and that each of said beams has an end block, 59, secured against its flat side or face so that a vertical recess or socket, 60, will be formed at said end into which the projecting upper ends of the end studs, 14, of the side sections may project.

When the side and ceiling sections have been engaged the vertical side flues, 57, will communicate with the horizontal ceiling flues, 38. To effect a tight joint at this connection I provide a flue-joint strip, 61, which is secured in the corner joint between the vertical and horizontal flues, as shown in Figs. 1 and 3 of the drawings.

By referring to Figs. 2, 3, 5, 9, 10 and 11 it will be noted that a tie bar, 62, extends horizontally at the upper end of the side walls and from one end to the other of the kiln. This tie bar passes through the notches, 58, in the locking beams and also through notches, 63, in the end blocks, 59, and notches, 64, in the ends of beams, 51, and, 42. This tie bar extends horizontally from one corner post, 22, of the kiln, across the upper ends of all the side wall sections and to the corner post, 22, at the opposite end of the kiln. Suitable fastenings are driven through the tie bar to secure the same to the side and ceiling sections and by this means all the sections at the top of the kiln are securely held together.

By referring to Fig. 10, it will be seen that at each end the under side of each ceiling section is provided with spaced-apart tongues, 65, which latter project between the top-edge tongues, 21, on the upper ends of the side sections and effect a tight closure of the kiln between the side and ceiling sections.

The roof, 66, of the kiln may be constructed in any suitable way and a detailed description of the same is deemed unnecessary.

By referring to Figs. 1, 2, 3, 5 and 7 it will be seen that the ends of the kiln are closed by door-sections which will now be explained.

In Figs. 5 and 7, it is clearly shown that at each end of the kiln the vertical partitions, 30, extend sufficiently beyond the inner vertical face of the corner post to permit a vertical jamb-strip, 67, to be secured thereto. It will also be noted that the end ceiling sections, 39, are provided along the under side of the outer beam, 41, with a horizontal jamb-strip, 68. The lower end wall sections, 24, are also provided with sill strips, 69, which form stops for the doors at the lower edges.

The doors are formed in four sections, 70, and, 71, and, 72, and, 73, respectively as shown particularly in Figs. 2, 3, and 7.

Each door has a bottom bar, 74; a top bar, 75; and two vertical side bars, 76, which connect the top and bottom bars and form a rectangular frame with diagonally-extending brace bars, 77, in the frame. Horizontal cover boards, 78, are secured to the outer and inner faces of the door frame and a filling of saw-dust, 79, is packed in each door for insulating the same against the atmospheric condition on the inner and outer sides of the kiln.

The two end doors, 70, and, 71, are secured to the corner posts, 22, by suitable hinges, 80,—the hinges being attached at the outer exposed vertical edges of said doors and posts.

The inner doors, 72, and, 73, are carried by the door sections, 70, and, 71, respectively by means of hinges, 81, which latter are attached along the inner vertical edges of the connected door sections. The door section, 70, has a vertical strip, 82, along its free vertical edge which overlaps onto the outer face of the door section, 72, while the door section, 73, has a similar strip, 83, which overlaps onto door section, 71. Another vertical strip, 84, is carried on the free edge of door section, 72, so as to lap over onto the outer side of door-section, 73, when the sections are closed. By means of these strips, 82, 83, and, 84, the hinged-together edges of the several door sections and the confronting edges of the sections, 72, and, 73, will be substantially tight when the door-sections are closed, as shown in Fig. 7.

At the bottom of the kiln there is provided a series of vertical posts, 85, on which horizontal track-beams, 86, are sustained in an elevated position so that track rails, 87, may be laid on said beams and extend through the kiln from one end to the other. Suitable cross braces, 88, and, 89, extend cross-wise of the kiln to rigidly secure the track-beams in place.

Below the track-rails, 87, and between the latter and the lower ends of the vertical flues, I provide a series of heating pipes, 90, to which steam may be supplied for the purpose of heating the kiln. The particular construction of these pipes is not essential to the present invention and a description of the same is therefore deemed unnecessary.

The operation of the kiln constructed as above explained, is not essentially different from other successful kilns but the construction whereby the bottom, side walls, ceiling, doors and interior flues are formed in sections whereby the kiln may be readily set up or taken down and the constructions employed to brace and secure said sections together by wooden tongues, locking beams and tie bars, entirely removes all expansion and contraction troubles which would be present to a very great extent if metallic braces and tie devices were employed.

Having thus described my invention what I claim and desire to secure by Letters Patent is:—

1. A portable dry kiln structure having a plurality of side sections; a side bar extending crosswise of the lower ends of all the side sections to hold the same together; a plurality of ceiling sections; locking beams interposed between and locking the ceiling sections together said locking beams also engaging the side sections; tie bars extending crosswise of the upper ends of the side sections to hold said latter sections together at the top and in a direction lengthwise of the kiln and flues formed in the kiln at the inner side of the side sections.

2. A portable dry kiln structure having a plurality of side sections; a plurality of ceiling sections; a locking beam interposed between adjacent ceiling sections and having a notch at its end to receive the upper edge of the side sections; a tie bar extending along the ends of the ceiling sections and securing the latter down on the side sections,—said tie bar also extending through the notches in the ends of the locking beams; and flues formed at the inner side of some of the side and ceiling sections.

3. A portable dry kiln structure having a plurality of side sections each with studs projecting above their upper ends; a plurality of ceiling sections each of which latter has a center and a side beam with a socket at the end of each beam to receive a stud on the side section; a locking beam between each two ceiling sections to lock the two together and the outer ends of said locking beams having a notch in the under side to engage the upper edge of the side sections and flues formed at the inner side of some of the side and ceiling sections.

4. A portable dry kiln structure having a plurality of rectangular side sections with vertical end and center studs in each section and each side section having a tongue and groove connection along its upper edge and below the upper ends of the side and center studs thereof; ceiling sections having tongue and groove connections at opposite ends to engage the connections on the upper ends of the side sections and the ceiling sections also having sockets at each end to receive the projecting ends of the side-section studs, and flues formed at the inner side of some of the side and ceiling sections.

In testimony whereof I affix my signature in presence of two witnesses.

JOHN F. OLDFIELD.

Witnesses:
 CHARLES B. MANN, Jr.,
 G. FERD. VOGT.

Copies of this patent may be obtained for five cents each, by addressing the "Commissioner of Patents, Washington, D. C."